(12) United States Patent
Suenaga et al.

(10) Patent No.: US 6,388,899 B1
(45) Date of Patent: May 14, 2002

(54) INVERTER CIRCUIT

(75) Inventors: Haruo Suenaga, Osaka; Yoshiaki Ishio; Kenji Yasui, both of Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/856,821

(22) PCT Filed: Sep. 13, 2000

(86) PCT No.: PCT/JP00/06268

§ 371 Date: May 25, 2001

§ 102(e) Date: May 25, 2001

(87) PCT Pub. No.: WO01/24349

PCT Pub. Date: Apr. 5, 2001

(30) Foreign Application Priority Data

Sep. 27, 1999 (JP) .......................................... 11-272409

(51) Int. Cl.[7] ............................................. H02M 3/335
(52) U.S. Cl. ......................................... 363/20; 363/131
(58) Field of Search ............................. 363/15, 16, 18, 363/19, 20, 21.01, 131

(56) References Cited

U.S. PATENT DOCUMENTS 5,535,112 A * 7/1996 Vazquez Lopez et al. .... 363/20
5,619,402 A    4/1997 Liu
5,694,304 A    12/1997 Tlefus et al.
6,130,826 A * 10/2000 Matsumoto .................. 363/20
6,144,564 A * 11/2000 Fraidlin et al. ............... 363/16
6,285,568 B1 * 9/2001 Taurand .................... 363/21.14

FOREIGN PATENT DOCUMENTS

EP    0 474 312    3/1992
EP    0 827 263    3/1998

OTHER PUBLICATIONS

Patent Abstracts of Japan: Switching Power Supply, publ. #03207263, publ. date Sep. 1991.
WO 98/38836, High Frequency Heating Equipment, Sep. 1998.

* cited by examiner

*Primary Examiner*—Adolf Deneke Berhane
(74) *Attorney, Agent, or Firm*—Pearne & Gordon LLP

(57) ABSTRACT

The inverter circuit can be structured by a simple structure as follows: an inductive element (the primary winding) 23 whose one end is connected to a DC power source 21; the first capacitor 24 connected in parallel with it; a serial circuit of the second switching element 27 and the second capacitor 25; a common connection point to which the primary winding 23, the first capacitor 24, and the other end of the serial circuit are connected; and the first switching element 26 to open and close control between the DC power source 21 and the other portion, are provided, and a drive signal generating means (resistance) is connected between the control terminal of the second switching element 27 and the common connection point.

4 Claims, 10 Drawing Sheets

(MODE 1)

(MODE 2)

(MODE 4)

(MODE 3)

(MODE 5)

(MODE 6)

INVERTER CIRCUIT

This application claims the benefit of International Application Number PCT/JP00/06268, which was published in English.

TECHNICAL FIELD

The present invention relates to a field of a high-frequency heating apparatus for conducting a dielectric heating by using a magnetron such as electronic ranges, or for conducting an induction heating by using an induction heating coil such as electromagnetic cooking devices.

BACKGROUND ART

Conventionally, for this kind of inverter circuit, the down sizing, weight reduction, and cost reduction are positively promoted in various fields. Further, also in the high-frequency heating apparatus to cook the food by the microwave generated by the magnetron, the down sizing and weight reduction of the power source to drive the magnetron are required, and the requirement is realized by employing the switching technology.

Further, in order to reduce a switching loss of the switching element which operates at the high frequency, a system using a resonance type circuit system, which is an important technology of the switching power source, is also realized. Further, prior to the present invention, a problem in which, by the action of the resonance circuit, the voltage applied onto the switching element is increased, thereby, the withstand voltage of the switching element or relating electric parts is increased, and as the result, the size and the cost are also increased, has been solved by the structure shown below.

That is, as shown in FIG. 10, the system comprises: a DC power source 1; a leakage transformer 2 connected to the DC power source; the first switching element 6 serially connected to a primary winding 3 side of the leakage transformer 2; the first capacitor 4; a serial circuit of the second capacitor 5 and the second switching element 7; a drive means 8 having an oscillator to drive the first switching element 6 and the second switching element 7; a rectifier means 10 connected to the secondary winding 9 side of the leakage transformer 2; and a magnetron 11 connected to the rectifier means 10, and the system is structured such that the serial circuit of the first capacitor 5 and the second switching element 7 is connected in parallel with the primary winding 3 side of the leakage transformer 2.

The characteristic of the circuit structure is a point in which, by using the second auxiliary capacitor 5 having a larger capacity value than the first capacitor 4 constituting the resonance circuit together with the leakage transformer 2, the applied voltage of the first main switching element 6 can be reduced.

However, in the conventional inverter circuit, because the second switching element 7 operates at the higher voltage different from that of the first switching element 6, the drive circuit to dive it requires a high withstand voltage drive circuit such as an insulation type. Accordingly, it becomes a major interference for the simplification of the circuit.

DISCLOSURE OF INVENTION

In order to solve the above problems, the present invention comprises: an inductive element whose one end is connected to the DC power source; the first switching element to control the supplying status of the DC power source to the inductive element; the first and second capacitors for the resonance of the inductive element; and the second switching element serially connected to the second capacitor, wherein the second capacitor is serially connected to the first switching element, and the drive signal generating means is connected between the first switching element side of the second capacitor and the control terminal of the second switching element.

According to a first aspect of the invention, the applied voltage of the first switching element can be decreased, and the second switching element can be driven by the very simple structure.

Further, according to a second aspect of the invention, by the negative voltage limiting circuit, because the negative excessive voltage is blocked, the resistance value of the second drive section is set to a small value, and the drive signal of the second switching element is increased, thereby, its on-loss can be reduced.

Further, according to a third aspect of the invention, by the positive voltage limiting circuit, because the positive voltage can be limited, the resistance value of the second drive section is set to smaller value, and the drive signal of the second switching element just before the completion of the mode 4, can be increased, thereby, its on-loss can be reduced.

Further, according to a fourth aspect of the invention, when this resistance value is structured so that it is specifically decreased during a period in which the potential of the common connection point is lower than the potential of the DC power source, the off-operation of the second switching element is quickened, thereby, the switching loss can be reduced.

BEST MODE FOR CARRYING OUT THE INVENTION (First Embodiment)

Figure 1:
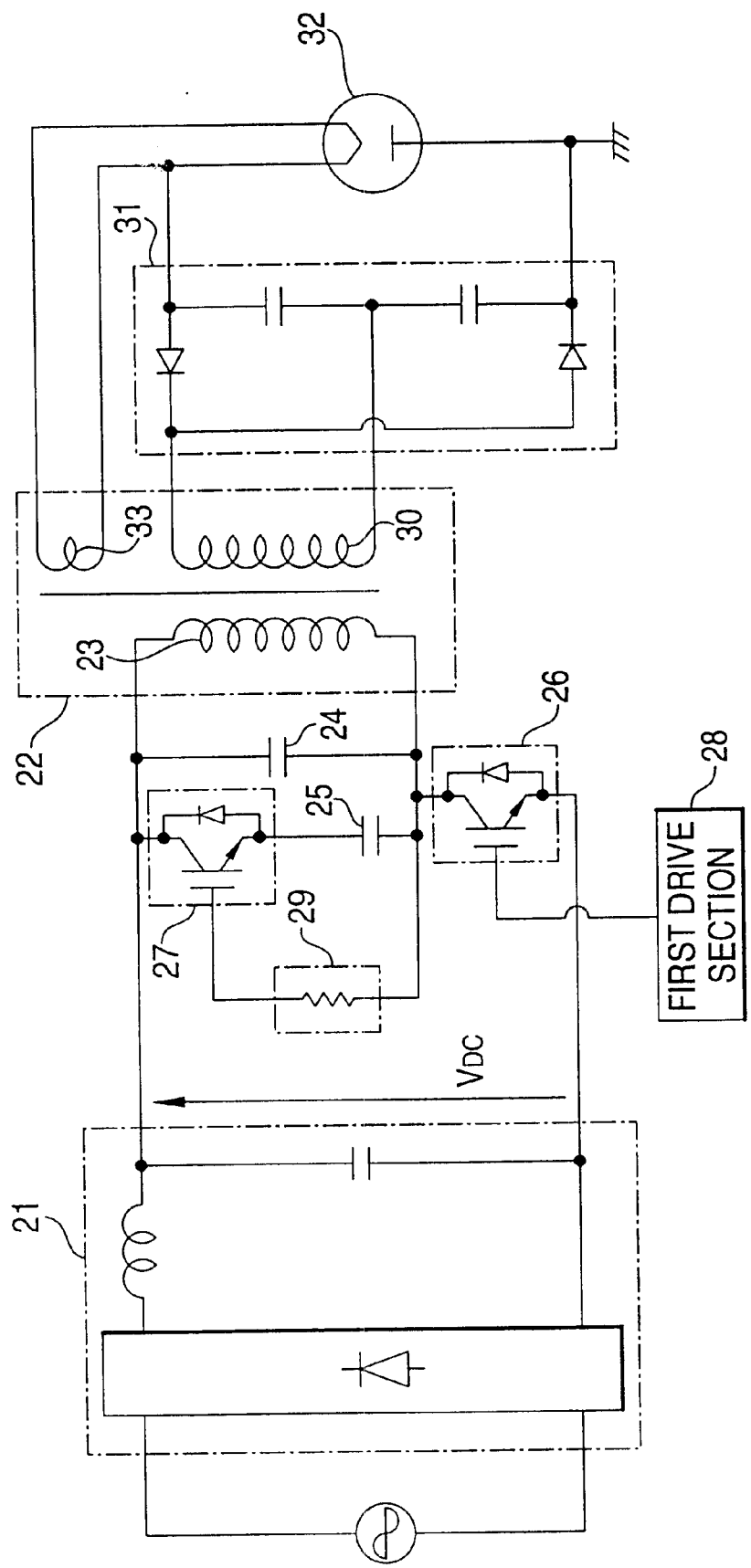
FIG. 1 is a circuit structural view for the magnetron drive used for a high-frequency heating apparatus of a first embodiment of the present invention.
Figure 2A:
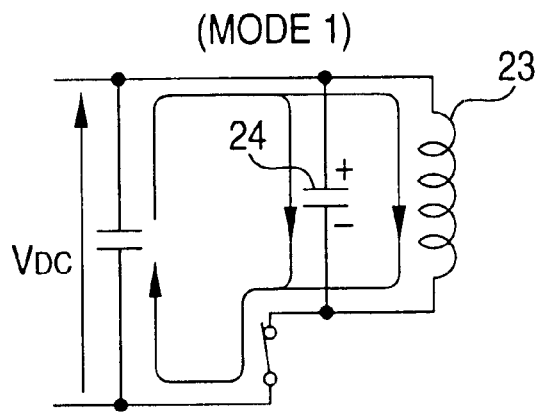
FIGS. 2A to 2F are circuit diagrams classified according to the operation modes of the first embodiment of the present invention.
Figure 2B:
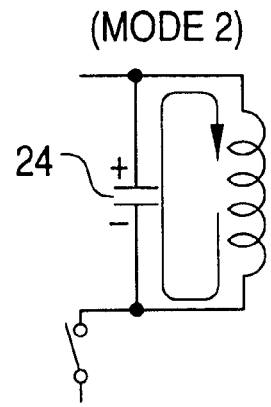
Figure 2C:
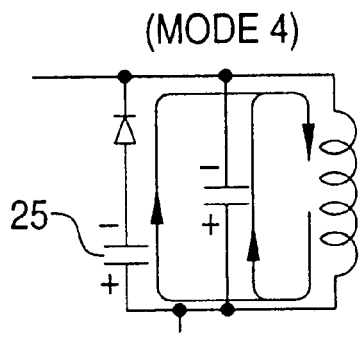
Figure 2D:
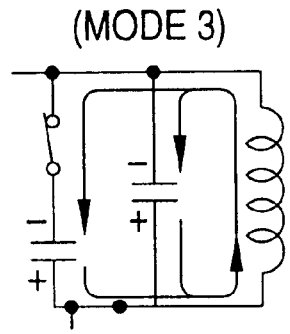
Figure 2E:
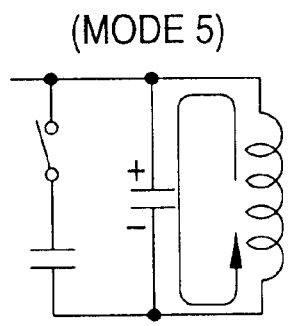
Figure 2F:
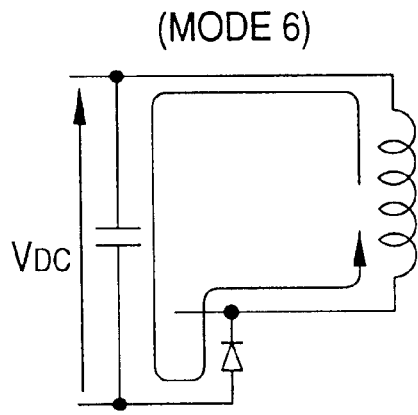
Figure 3:
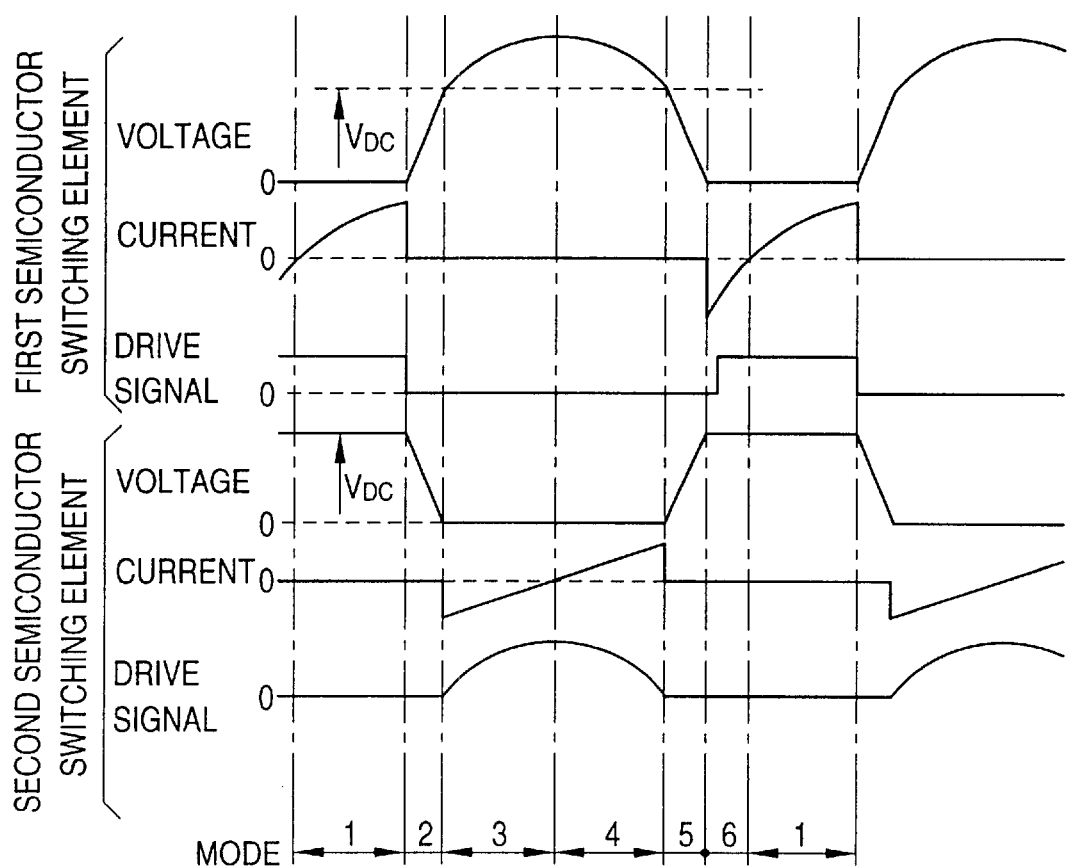
FIG. 3 is a view of the voltage current waveform of each portion constituting the circuit of the first embodiment of the present invention.

The first embodiment of the present invention will be described below. FIG. 1 is a circuit diagram showing the structure of an power conversion apparatus to drive a magnetron used for a high-frequency heating apparatus, for explaining the first embodiment. The high-frequency heating apparatus in the embodiment, is structured by: a DC power source 21; a leakage transformer 22 which is an inductive element; the first switching element 26; the first capacitor 24; the second capacitor 25; the second switching element 27; the first drive section 28; the second drive section 29; the full wave voltage doubler rectifier circuit 31, and a magnetron 32.

Herein, a serial circuit of the second switching element 27 and the second capacitor 25, and the primary winding of a leakage transformer 22 and the first capacitor 24 are connected in parallel, and a DC power source 21 applies the DC voltage VDC on the parallel circuit by full wave rectifying the commercial power. The first switching element 26 controls the supply of the DC power supply 21 to the parallel circuit. A high voltage output generated in the secondary winding 30 of the leakage transformer 22 is converted into the DC high voltage by the full wave voltage doubler rectifier circuit 31, and applied between an anode and a cathode of the magnetron 32. The tertiary winding 33 of the leakage transformer 22 supplies the current to the cathode of the magnetron 32.

Further, the first switching element 26 is structured by IGBT and a diode connected in antiparallel with it. The second switching element 27 is also structured in the same manner by the IGBT and the diode.

Further, by the first drive section 28, the drive signal of the first switching element 26 is given, and the drive signal of the second switching element 27 is given by the second drive section 29 connected between the control terminal and the common connection point of the parallel circuit.

Referring to FIGS. 2A to 2F and FIG. 3, operations of the above circuit will be described below. Initially, the drive signal is given to the fist switching element 26 in the mode 1. At this time, the current flows from the DC power source 21 through the primary winding 23 of the leakage transformer 22.

Next, in the mode 2, the first switching element 26 is turned off, the current flowing through the primary winding 23 begins to flow toward the first capacitor 24, and simultaneously the voltage of the first switching element 26 is increased. When the voltage of the first switching element 26 exceeds VDC, the operation moves to the mode 3, the diode constituting the second switching element 27 is turned on. Accordingly, the current from the primary winding 23 is shunted to the first capacitor 24 and to the second capacitor 25, and the inclination of the voltage of the first switching element 26 is moderated. In this mode 3, because the potential of the common connection point exceeds VDC, the drive signal is automatically inputted from the second drive section 29 into the control terminal of the second switching element 6, and this becomes effective in the next mode.

Next, when the current from the primary winding 23 passes 0, that is, by the resonance, the direction of the current passes through the primary winding 23 and the first and second capacitors 24 and 25, is reversed, the operation is moved to the mode 4, and the electric charges of the first capacitor 24 begins to discharge toward the primary winding 23. Further, because, into the control terminal of the second switching element 27, the drive signal from the second drive section 29 is inputted already, the electric charges of the second capacitor 25 also begins to discharge toward the primary winding 23. Being accompanied by the discharge of these two capacitors, the voltage of the first switching element 26 is lowered.

Next, when the voltage of the first switching element 26 reaches VDC, that is, the discharge of the first and second capacitors 24 and 25 is completed, the operation moves to the mode 5. In the mode 5, because the potential of the common connection point is lower than VDC, the drive signal from the second drive section 29 is not inputted into the control terminal of the second switching element 6, and the second switching element 27 is turned off. Accordingly, because the current in the primary winding 23 flows only to the first capacitor 24, the lowering inclination of the voltage of the first switching element 26 becomes sharp.

Next, in the mode 6, the voltage of the first capacitor 24 reaches VDC, and the diode constituting the first switching element 26 is turned on. Accordingly, the current flowing from the primary winding 23 toward the first capacitor 24 by the resonance, is regenerated to the DC power source 21 through the diode. When the regenerative current is 0, because the operation moves to the mode 1, it is necessary that the first switching element 26 is previously turned on while the regenerative current flows.

As describe above, in the modes 3 and 4 of the present embodiment, the first and second capacitors 24 and 25 are connected in parallel with the primary winding 23, and the voltage increase of the first switching element 26 by the resonance current is lightened, and its impressed voltage is decreased. Further, in the mode 5, when the second capacitor 25 is separated, and the capacitor of the resonance circuit formed together with the primary winding 23 is only the first capacitor 24, the voltage of the first switching element 26 can be surely reached 0. Accordingly, when the first switching element 26 is turned on in the mode 1, the primary winding 23 of the leakage transformer and the first capacitor 24 are connected in parallel, and its applied voltage becomes 0, thereby, the switching loss at the time of turning-on, can be decreased.

Further, the voltage applied onto the second switching element 27 is 0 because the diode constituting the second switching element 27 is turned on during the modes 3 and 4, and during the modes 5 and 6, lower than the DC power source voltage VDC, its maximum value can be the DC power source voltage VDC, and further, the drive signal of the second switching element 27 is automatically supplied from the second drive section 29 connected between the control terminal and the common connection point of the parallel circuit.

Incidentally, FIG. 1 shows an embodiment in which the first capacitor 24 is connected in parallel with the primary winding 23 of the leakage transformer 22, and because an AC output impedance of the DC power source 21 is nearly 0, in the AC equivalent circuit, even when it is the other inverter circuit system which can be regarded such that the first capacitor 24 is connected in parallel with the primary winding 23, for example, a system in which the first capacitor 24 is connected in parallel with the first switching element 26, the structure of the present invention is effective.

Further, FIG. 1 explains the first switching element 26 and the second switching element 27, by using the structure of the IGBT and the diode connected in antiparallel with it, however, the present system is not limited to this, but can be applied for the other element, for example, also for the case of the bipolar transistor and diode.

Further, in the present invention, the dielectric heating apparatus using the magnetron is described, however, in a field of the high-frequency heating apparatus to conduct the inductive heating by using the inductive heating coil such as the electromagnetic cooking devices, when the primary winding 23 of the leakage transformer 22 is replaced with the inductive heating coil, the present invention can be applied.

(Second Embodiment)

Figure 4:
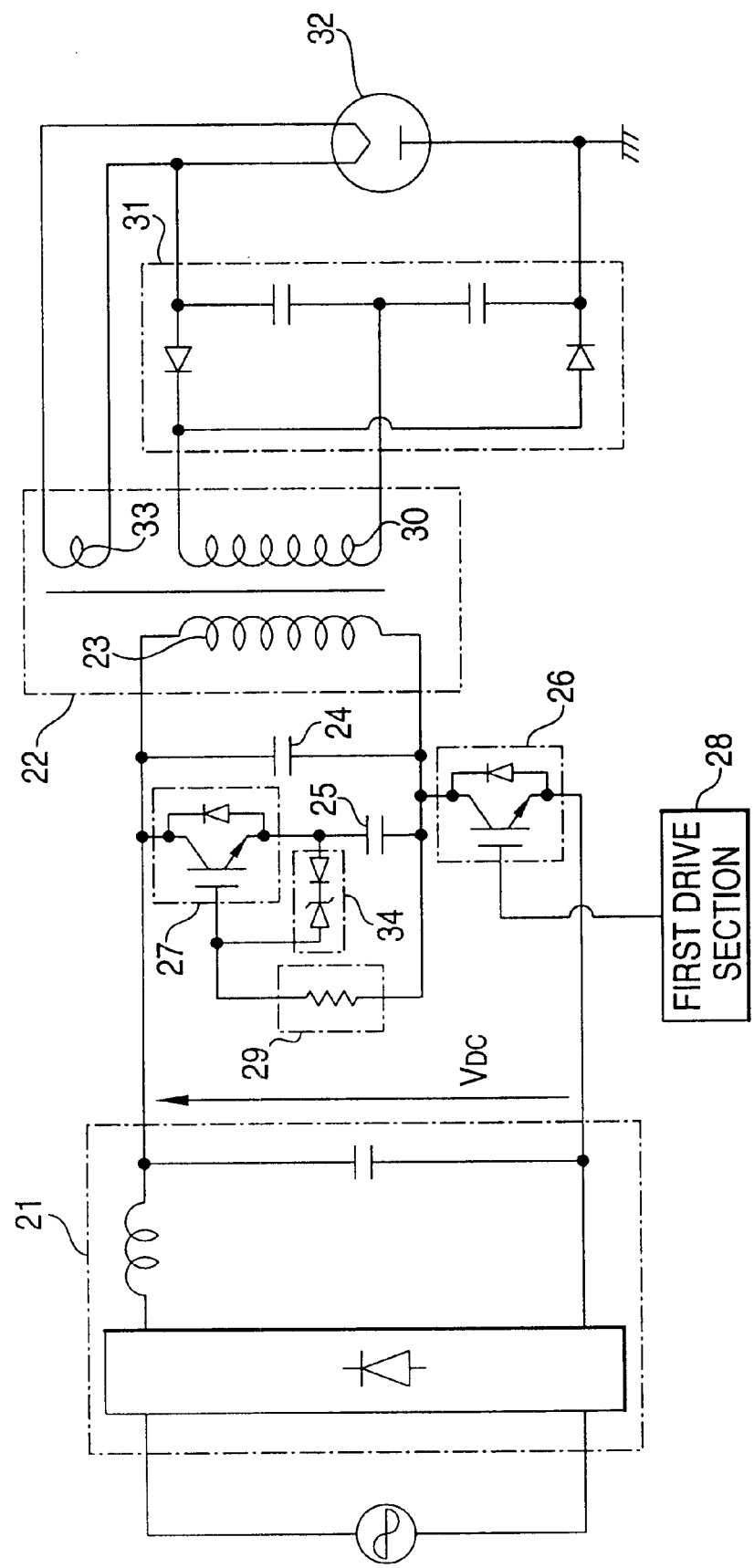
FIG. 4 is a circuit structural view for a magnetron drive used for the high-frequency heating apparatus of a second embodiment of the present invention.

Further, as shown in FIG. 4, a method in which a serial circuit of a diode and a Zener diode (negative voltage limiting circuit 34) is connected to both ends of the second switching element 27, is also effective.

Figure 5:
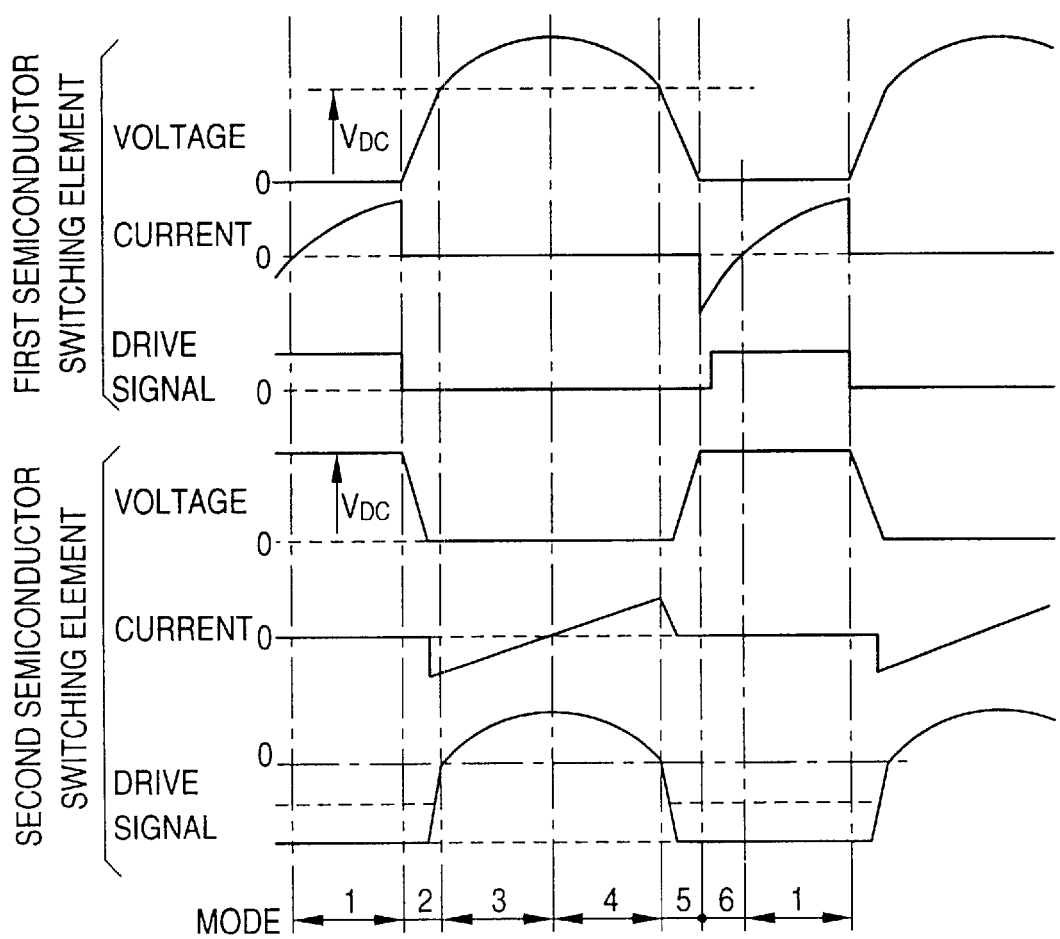
FIG. 5 is a view of the voltage current waveform of each portion constituting the circuit of the second embodiment of the present invention.

That is, according to this structure, at the time point of the start of the mode 5, when the second capacitor 25 is charged to the negative polarity, accompanied by the delay of off-operation of the second switching element 6, the drive signal inputted into the control terminal of the second switching element 6 becomes negative voltage, however, the negative voltage limiting circuit 34 can limit the negative voltage by such the case, in the manner as shown in FIG. 5.

Incidentally, the negative voltage limiting circuit 34 is the serial circuit of the diode and the Zener diode, however, it can also be simplified to only the diode.

(Third Embodiment)

Figure 6:
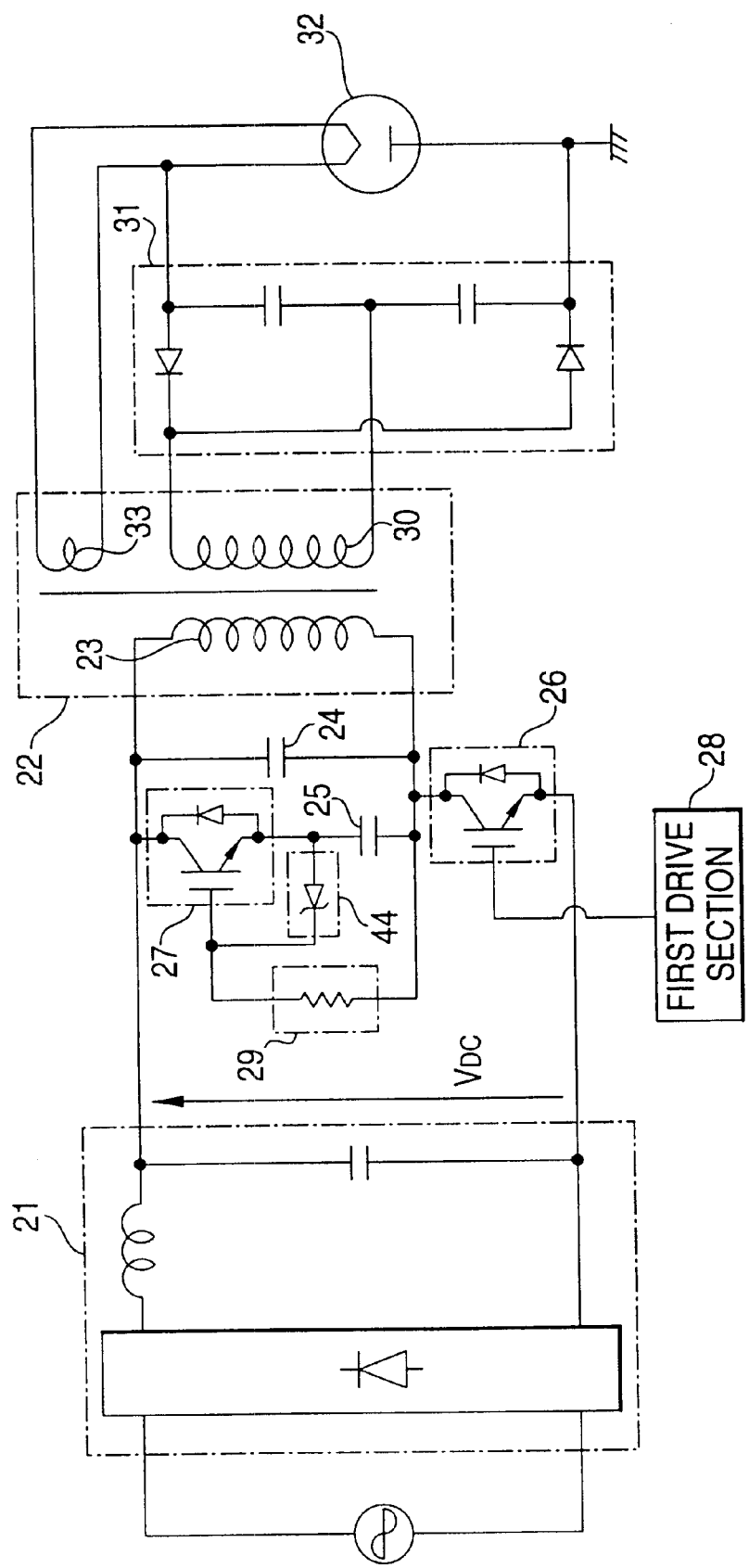
FIG. 6 is a circuit structural view for the magnetron drive used for the high-frequency heating apparatus of a third embodiment of the present invention.

Further, as shown in FIG. 6, a method in which a positive voltage limiting circuit 44 is connected to both ends of the second switching element 27, is also effective.

Figure 7:
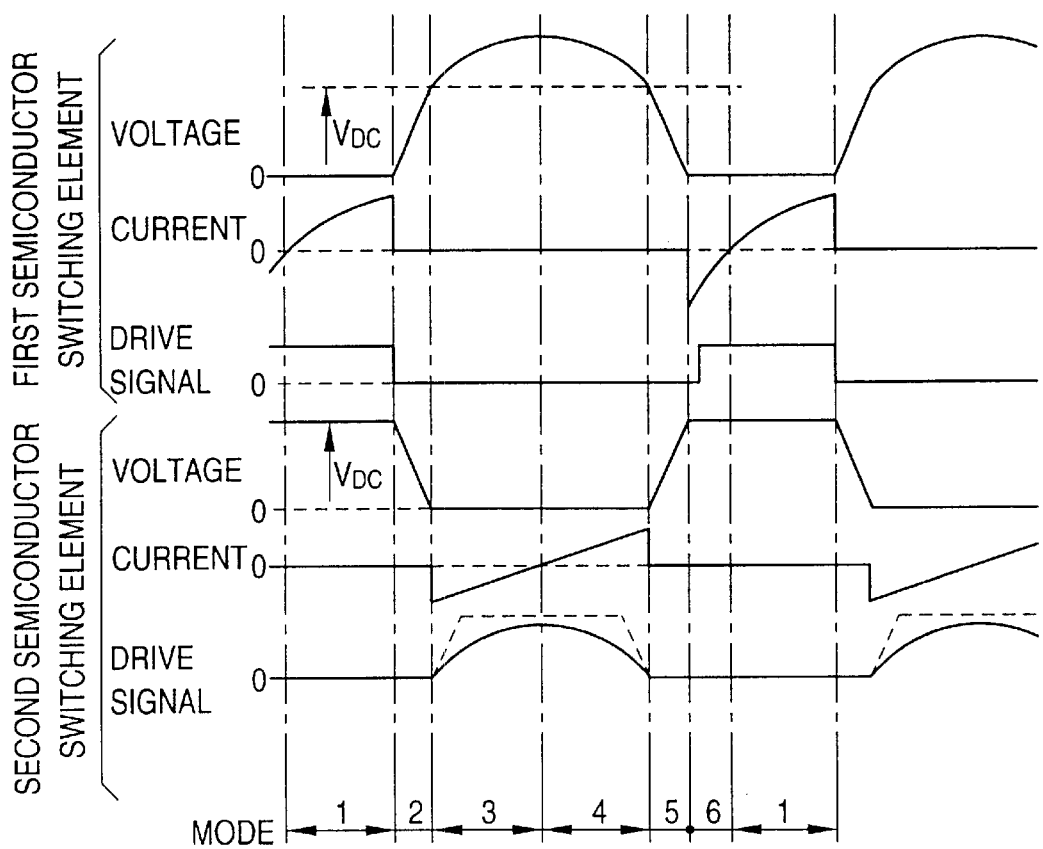
FIG. 7 is a view of the voltage current waveform of each portion constituting the circuit of the third embodiment of the present invention.

That is, according to this structure, the positive voltage limiting circuit 34 can limit the positive voltage of the control terminal of the second switching element 6 in the modes 3 and 4. Accordingly, because the control terminal voltage just before the completion of the mode 4 can be set larger as shown by the dotted line in FIG. 7, the on-loss of the second switching element 6 can be decreased.

(Fourth Embodiment)

Figure 8:
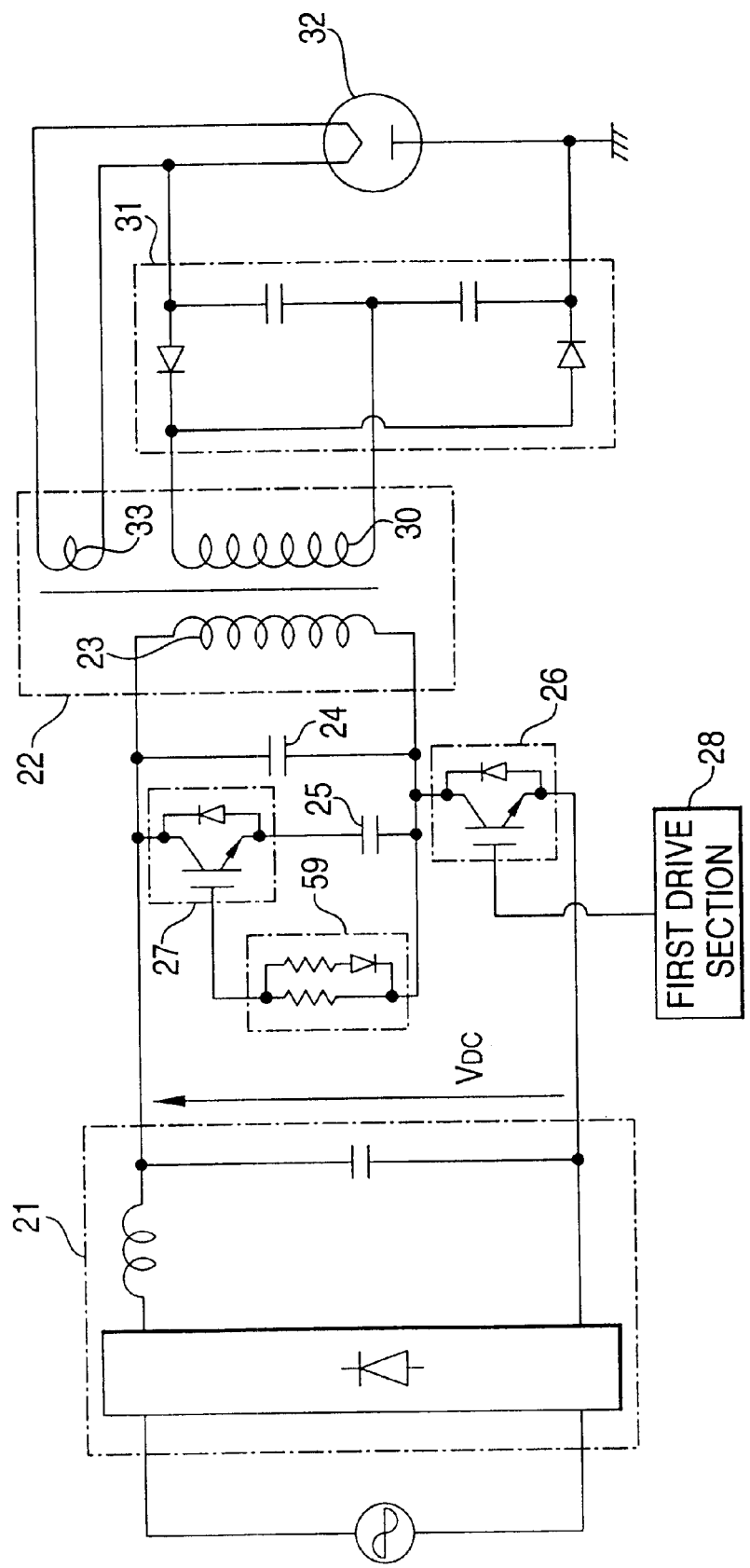
FIG. 8 is a circuit structural view for the magnetron drive used for the high-frequency heating apparatus of a fourth embodiment of the present invention.
Figure 9:
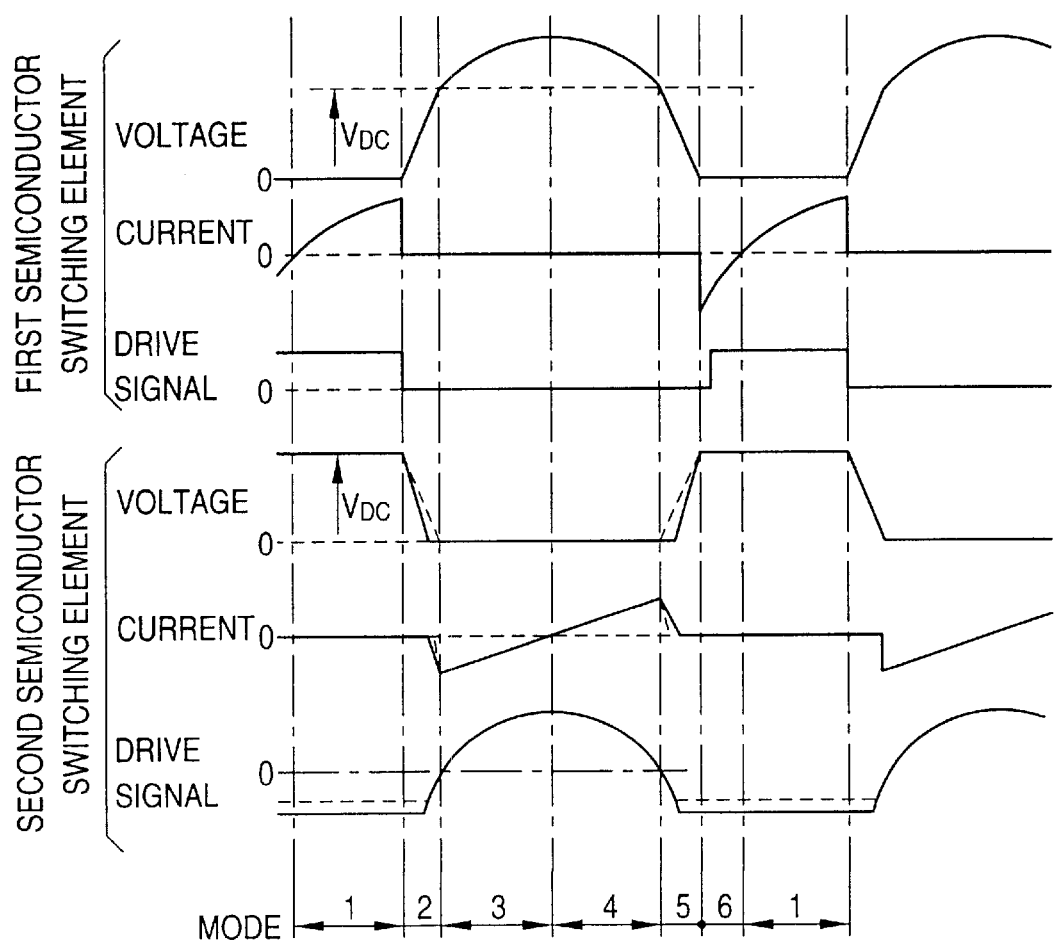
FIG. 9 is a view of the voltage current waveform of each portion constituting the circuit of the fourth embodiment of the present invention.
Figure 10:
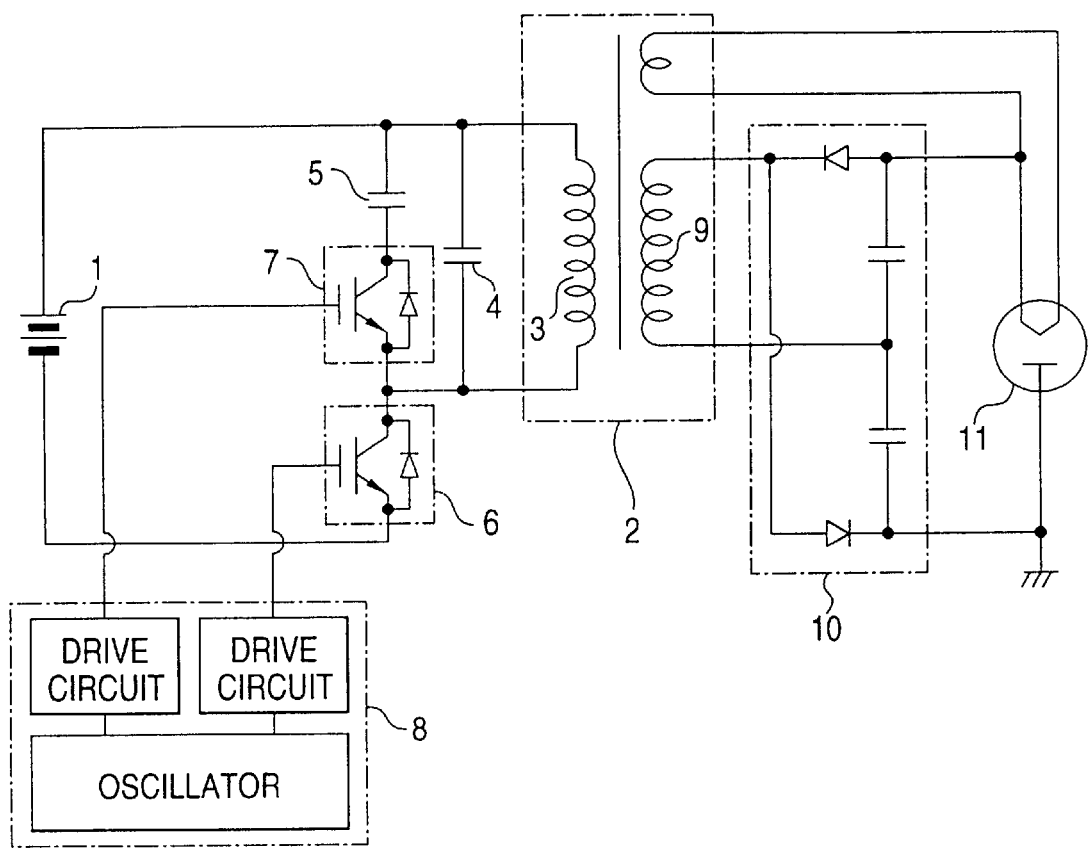
FIG. 10 is a circuit structural view for the magnetron drive used for the high-frequency heating apparatus of the conventional art.

Further, as shown in FIG. 8, as the second drive section 59, a method in which the serial connection of the diode and the resistance is provided along with the main resistance, is also effective.

That is, according to this structure, because the potential of the common connection point is smaller than VDC in the mode 5, the drive signal from the second drive section 59 inputted into the control terminal of the second switching element 6 becomes off (negative) polarity. At the start point of the mode 5, the second capacitor 25 is charged to the negative polarity until the second switching element 27 is switched to the off status, however, by the influence in which the potential of the common connection point is smaller than VDC, the impedance of the second drive section 59 is smaller than that in the mode 4, and the inclination of the attenuation of the drive signal becomes sharp. Accordingly, the electric charges of the control terminal of the second switching element 27 are quickly discharged, and the off-operation is quickened, thereby, the switching loss can be decreased.

As described above, according to the invention of the first aspect, the applied voltage of the first switching element can be decreased, and by very simple structure, the second switching element can be driven.

Further, according to the invention of the second aspect, because the negative excessive voltage is blocked by the negative voltage limiting circuit, the resistance value of the second drive section is set to a smaller value, and the drive signal of the second switching element is increased, and thereby, its on-loss can be decreased.

Further, according to the invention of the third aspect, because the positive voltage can be limited by the positive voltage limiting circuit, the resistance value of the second drive section is set to a smaller value, and the drive signal of the second switching element just before the completion of the mode 4 can be increased, and thereby, its on-loss can be decreased.

Further, according to the invention of the fourth aspect, when the system is structured such that the resistance value is specifically smaller during a period in which the potential of the common connection point is lower than the potential of the DC power source, the off-operation of the second switching element is hastened, thereby, the switching loss can be decreased.

Industrial Applicability

An inverter circuit of the invention is industrially applicable to a field of a high-frequency heating apparatus for conducting a dielectric heating by using a magnetron such as electronic ranges, or for conducting an induction heating by using an induction heating coil such as electromagnetic cooking devices.

What is claimed is:

1. An inverter circuit comprising:

an induction element whose one end is connected to a DC power source;

a first switching element for controlling a supplement of an electrical power from the DC power source to the induction element;

a first capacitor for resonance of the induction element;

a second capacitor for the resonance of the induction element;

a second switching element connected in series with the second capacitor; and a drive signal generator whose one end is connected to the first switching element and the second capacitor through a node, the drive signal generator whose other end is connected to a control terminal of the second switching element.

2. The inverter circuit according to claim 1, further comprising a negative voltage limiting circuit for limiting a negative voltage of the drive signal generator.

3. The inverter circuit according to claim 1 further comprising a positive voltage limiting circuit for limiting a positive voltage of the drive signal generator.

4. The inverter circuit according to claim 1, wherein the drive signal generator is provided so that an impedance in a period in which a potential of the node connecting the second capacitor to the first switching element is not larger than a potential of the DC power source, is not larger than an impedance in the period in which the potential of the node is not smaller than the potential of the DC power source.

* * * * *